United States Patent [19]

Merrill et al.

[11] 4,202,785
[45] May 13, 1980

[54] POLYESTERIONOMERS HAVING UTILITY IN LIQUID ELECTROGRAPHIC DEVELOPER COMPOSITIONS

[75] Inventors: Stewart H. Merrill; Susan E. Hartman; John M. Noonan, all of Rochester; Mohammad A. Sandhu; Domenic Santilli, both of Webster, all of N.Y.

[73] Assignee: Eastman Kodak Company, Rochester, N.Y.

[21] Appl. No.: 906,174

[22] Filed: May 15, 1978

[51] Int. Cl.$^2$ .............................................. G03G 9/12
[52] U.S. Cl. ..................................... 430/106; 528/295; 430/105; 430/115; 430/117
[58] Field of Search ...................... 252/62.1 P, 62.1 L; 260/755; 427/1 S; 96/1 LY; 528/295

[56] References Cited

U.S. PATENT DOCUMENTS

| | | | |
|---|---|---|---|
| 2,940,934 | 6/1960 | Carlsow | 252/62.1 L |
| 3,135,695 | 6/1964 | York | 252/62.1 L |
| 3,853,820 | 12/1974 | Vachon | 528/295 |
| 3,929,489 | 12/1975 | Areesi et al. | 96/115 R |
| 3,959,213 | 5/1976 | Gilkey et al. | 260/45.7 P |
| 4,052,325 | 10/1977 | Santilli | 252/62.1 L |

*Primary Examiner*—John D. Welsh
*Attorney, Agent, or Firm*—John R. Everett

[57] ABSTRACT

Polyesterionomers useful as a binder in liquid electrophotographic developers having the structure are disclosed.

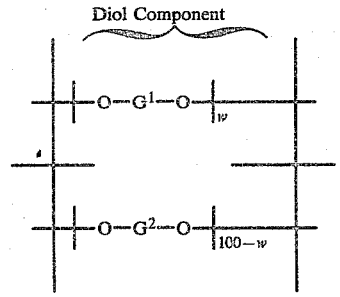

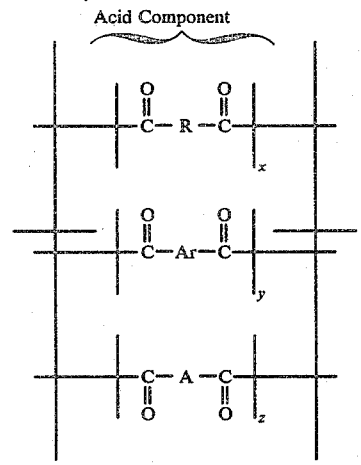

11 Claims, No Drawings

POLYESTERIONOMERS HAVING UTILITY IN LIQUID ELECTROGRAPHIC DEVELOPER COMPOSITIONS

FIELD OF THE INVENTION

This invention relates to electrography and to novel liquid developer compositions for developing electrostatic charge patterns. It also relates to new polyesterionomers.

BACKGROUND OF THE INVENTION

Electrographic imaging and development processes have been extensively described in both the patent and other literature. Generally, these processes have in common the steps of forming a latent electrostatic image on an insulating electrographic element, such as a photoconductive insulating layer coated on a conductive support. The electrostatic latent image is then rendered visible by a development step in which the charge image-bearing surface of the electrographic element is brought into contact with a suitable developer composition.

Liquid developer compositions of the type described, for example, in Metcalfe et al, U.S. Pat. No. 2,907,674, issued Aug. 6, 1959, have been used heretofore to develop latent electrostatic images. Such developers usually comprise a stable dispersion of charged particles known as toner particles comprising a pigment such as carbon black, generally associated with a resinous binder, such as, an alkyd resin, dispersed in an electrically insulating liquid which serves as a carrier. A charge control agent is sometimes included to stabilize the magnitude and polarity of the charge on the toner particles. In some cases, the binder itself serves as a charge control agent.

Liquid developers for electrography should possess both suspension stability and charge stability. They should also produce images that have (a) good wear resistance, (b) high image density, (c) high resolution, (d) low background, and (e) relatively low fusing temperatures. Various additives have been suggested to control or effect one or more of these desirable properties. However, it remains difficult to formulate liquid developers that achieve all or most of the desirable properties listed above.

Polyester resins have been suggested for use in liquid electrographic developers in the past. U.S. Pat. No. 4,052,325 to Santilli granted Oct. 4, 1977, discloses a highly useful electrographic developer composition containing a polyesterionomer. However, the wear or rub resistance of the images formed from this developer could be improved for some applications, such as those in which imaged surfaces are handled frequently.

SUMMARY OF THE INVENTION

The present invention provides a class of polyesterionomers which are highly useful as binders in liquid electrographic developer compositions. The developers of the present invention are stable and provide images having high density, high resolution, low background and relatively low fusing temperatures. Unexpectedly the wear or rub resistance of these polymers is superior to the developer compositions disclosed in Santilli.

The polyesterionomers useful in the present invention have a structure according to Formula I

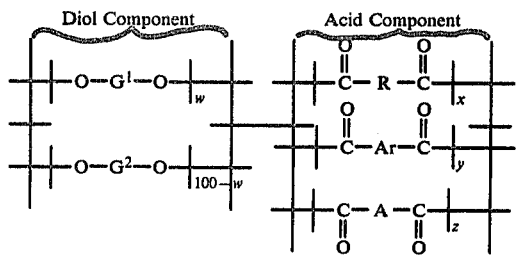

wherein
$G^1$ represents a straight or branched chain alkylene having about 2 to 12 carbon atoms or, substituted or unsubstituted, cycloalkylene, cycloalkylenebis(oxyalkylene) or cycloalkylenedialkylene;

$G^2$ represents substituted or unsubstituted, arylene, cycloalkylene or a straight or branched chain alkylene having about 2 to 12 carbon atoms;

R and Ar, which are always different, represent 1,1,3-trimethyl-3-phenylindan-5,4'-diyl, or an unsaturated substituted or unsubstituted alicyclic group having about 7–10 ring carbon atoms or a substituted or unsubstituted moiety selected from the group consisting of alkylene, cycloalkylene, sulfonyldiarylene, arylene, arylenevinylene, arylenealkylene, arylenebisvinylene or arylenebisalkylene;

A represents a sulfoarylene, sulfoaryloxyarylene, sulfocyclohexylene, arylsulfonylimino, sulfonylarylene, iminobis(sulfonylarylene), sulfoaryloxysulfonylarylene and sulfoaralkylarylene or the alkali metal or ammonium salts thereof;

said $G^1$, $G^2$, R and Ar substituents are selected from the group consisting of alkyl, alkoxy, nitro, carboxyl, halo and cyano;

w is about 50 to about 100, preferably, 65 to about 100 mole percent of the total diol component; and of the total acid component x is about 25 to about 95, preferably 50 to about 80 mole percent;

y is about 1 to about 74, preferably 15 to 50 mole percent; and z is about 4 to about 35, preferably 5 to 15 mole percent.

All of the Formula I polymers are highly useful as binders in liquid developers. All of said polymers are novel in which, in the acid component, unsubstituted arylene is other than unsubstituted phenylene when either R or Ar is phenylenevinylene, phenylenebis(vinylene) or cyclohexylene.

Unless otherwise expressly indicated, the term arylene refers to divalent aromatic radicals such as phenylene, naphthylene and anthrylene; alkylene refers to a divalent alkyl radical having one to eight carbon atoms; alkyl and alkoxy refer to monovalent radicals having one to eight carbon atoms; halo refers to chloro, bromo, iodo etc; cycloalkylene refers to a cyclic hydrocarbon group having four to eight carbon atoms.

It is understood that when R is arylene, Ar may be a different arylene. For an example when R is meta-phenylene, Ar may be para-phenylene.

Liquid electrographic developers containing the polyesterionomers described in Formula I are useful in developing images formed in electrographic imaging processes. Such well-known imaging processes usually include the common steps of (a) forming a latent electrostatic image on an electrographic insulating element, such as a photoconductive insulating layer carried on a conductive support, and (b) developing the electrostatic latent image by applying to the latent image-bearing surface of the electrographic element a suitable developer composition.

DETAILED DESCRIPTION OF THE INVENTION

According to one embodiment of the present invention, useful polyesterionomers have a structure according to Formula I, wherein $G^1$ represents a straight or branched chain oxygen free alkylene having about 2 to 12 carbon atoms, substituted or unsubstituted, cyclohexylene, cyclohexylenebis(oxyethylene), 1,3-cyclobutylenedimethylene;

$G^2$ represents substituted or unsubstituted phenylene, cyclohexylene or a straight or branched chain oxygen free alkylene group having about 2 to 12 carbon atoms;

R and Ar, which are always different, represent 1,1,3-trimethyl-3-phenylindan-5,4'-diyl, or a substituted or unsubstituted moiety selected from the group consisting of cyclopentylene, 2-norbornen-5,6-ylene, 2,6-octahydronaphthalene, 1,2,3,4-tetrahydro-2,6-naphthylene, napthylene, phenylene, phenylenevinylene, phenyleneethylene, phenylenebisvinylene and phenylenebisethylene;

A represents sulfophenylene, sulfophenoxyphenylene, sulfocyclohexylene, 5-[N-(4-tolylsulfonyl)iminosulfonyl]-1,3-phenylene or iminobis(sulfonyl-1,3-phenylene) or alkali metal or ammonium salts thereof.

said $G^1$, $G^2$, R and Ar substituents are selected from the group consisting of alkyl, alkoxy, nitro, carboxyl, halo and cyano;

w is about 50 to about 100 mole percent;
x is about 25 to about 95 mole percent;
y is about 1 to about 74 mole percent; and
z is about 4 to about 15 mole percent.

According to a preferred embodiment of the present invention, useful polyesterionomers have a structure according to Formula I wherein $G^1$ represents 2,2-dialkyl-1,3-propylene or alkyl substituted or unsubstituted cyclobutylenedimethylene;

$G^2$ represents substituted or unsubstituted phenylene or a straight or branched chain alkylene group having about 2 to about 12 carbon atoms;

R and Ar, which are always different, represent substituted or unsubstituted phenylene, a substituted or unsubstituted moiety selected from the group consisting of ortho- or meta-cyclohexylene, cyclopentylene, 2-norbornen-5,6-ylene, 2,6-octahydronaphthylene, and 1,2,3,4-tetrahydro-2,6-naphthylene;

A represents sodium sulfophenylene, sodium sulfophenoxyphenylene, sodium sulfocyclohexylene, 5-[N-(4-tolylsulfonyl)potassio(iminosulfonyl]-1,3-phenylene or sodium iminobis(sulfonyl-1,3-phenylene);

said $G^1$, $G^2$, R and Ar substituents are selected from the group consisting of alkyl, alkoxy, nitro, carboxyl, halo and cyano;

w is about 60 to about 100 mole percent;
x is about 25 to about 60 mole percent;
y is about 35 to about 74 mole percent; and
z is about 1 to about 10 mole percent.

According to another preferred embodiment of the present invention, useful polyesterionomers have a structure according to Formula I wherein $G^1$ represents alkylene, cyclohexylenebis(oxyethylene) or a cyclohexylenedimethylene;

$G^2$ represents a straight or branched chain alkylene having 2 to 12 carbon atoms;

R and Ar, which are different, represent 1,1,3-trimethyl-3-phenylindan-5,4'-diyl, substituted or unsubstituted, phenylenevinylene, phenyleneethylene, phenylenebisvinylene or phenylenebisethylene and said substituents are selected from the group consisting of alkyl, alkoxy, nitro, halo, carboxyl and cyano;

A represents sodium sulfophenylene, sodium sulfophenoxyphenylene, sodium sulfocyclohexylene, 5-[N-(4-tolylsulfonyl)potassioiminosulfonyl]-1,3-phenylene or sodioiminobis(sulfonyl-1,3-phenylene);

w is about 50 to about 100, preferably 65 to about 100 mole percent;

x is about 50 to about 95, preferably 60 to about 80 mole percent;

y is about 5 to about 50, preferably 5 to about 50 mole percent; and z is about 4 to about 15, preferably 5 to about 15 mole percent.

According to a most preferred embodiment of the present invention, useful polyesterionomers are selected from the group consisting of Poly[ethylene-co-2,2-dimethyl-1,3-propylene (50:50) 1,1,3-trimethyl-3-phenyl-5,4'-indandicarboxylate-co-3,3'-(p-phenylene)diacrylate-co-5-(N-potassio-p-toluenesulfonamidosulfonyl)isophthalate (75/20/5)]

Poly[ethylene-co-2,2-dimethyl-1,3-propylene (50:50) 1,1,3-trimethyl-3-phenyl-5,4'-indandicarboxylate-co-3,3'-(p-phenylene)bispropionate-co-5-(N-potassio-p-toluenesulfonamidosulfonyl)isophthalate (75/20/5)]

Poly[1,4-cyclohexylenebis(oxyethylene) 1,1,3-trimethyl-3-phenyl-5,4'-indandicarboxylate-co-3,3'-(p-phenylene)diacrylate-co-3,3'-(sodioiminodisulfonyl)dibenzoate (75/20/5)]

Poly[1,4-cyclohexylene-bis(oxyethylene) 1,1,3-trimethyl-3-phenyl-5,4'-indandicarboxylate-co-3,3'-(p-phenylene)diacrylate-co-5-(4-sodiosulfophenoxy)isophthalate (75/20/5)]

Poly[1,4-cyclohexylene-bis(oxyethylene) 1,1,3-trimethyl-3-phenyl-5,4'-indandicarboxylate-co-3,3'-(p-phenylene)diacrylate-co-5-(N-potassio-p-toluenesulfonamidosulfonyl)isophthalate (75/20/5)]

Poly[1,4-cyclohexylene-bis(oxyethylene) 1,1,3-trimethyl-3-phenyl-5,4'-indandicarboxylate-co-3,3'-(p-phenylene)diacrylate-co-5-sodiosulfoisophthalate (75/20/5)]

Poly[2,2-dimethyl-1,3-propylene tephthalate-co-hexahydroterephthalate-co-5-sodiosulfoisophthalate (45/50/5)]

Poly[2,2-dimethyl-1,3-propylene isophthalate-co-1,2-cyclohexanedicarboxylate-co-5-sodiosulfoisophthalate (50/45/5)]

Poly[2,2-dimethyl-1,3-propylene 4-methyl-4-cyclohexene-1,2-dicarboxylate-co-terephthalate-co-5-(N-potassio-p-toluenesulfonamidosulfonyl)isophthalate (50/45/5)]

Poly[2,2-dimethyl-1,3-propylene 1,4-cyclohexanedicarboxylate-co-isophthalate-co-5-(N- potassio-p-toluenesulfonamidosulfonyl)isophthalate (55/40/5)]

Poly[2,2-dimethyl-1,3-propylene 3-nitrophthalate-co-1,2-cyclohexane-dicarboxylate-co-5-sodiosulfoisophthalate (45/50/5)]

Poly[2,2-dimethyl-1,3-propylene 5-nitroisophthalate-co-1,2-cyclohexanedicarboxylate-co-5-sodiosulfoisophthalate (40/55/5)]

Poly[2,2-dimethyl-1,3-propylene 5-nitroterephthalate-co-1,2-cyclohexanedicarboxylate-co-5-sodiosulfoisophthalate (40/55/5)]

In the above polymers the numbers immediately following the monomer names refer to the weight ratio of the diol and acid components respectively. If only one diol component is present, one monomer represents the entire diol component and no ratio is needed.

In general, useful polyesterionomers of the present invention have a glass transition ($T_g$) temperature of from about 40° to about 150° C., preferably within the range of from about 40° to about 100° C. Polyesterionomers having a $T_g$ in the aforementioned preferred range can be heat-fixed to smooth-surfaced dielectric coated receiving elements, as well as ordinary support surfaces, such as paper without difficulty.

Higher $T_g$ materials having a $T_g$ above about 150° C. may also be used. However, in the latter case the support to which the toner image is fused must be selected with care. The fusing temperature employed should not damage or char the support. It is especially useful to employ polymers of the present invention which have a relatively sharp $T_g$ range, i.e., the polymer completely melts over a temperature range of less than about 10° C.

The glass transition temperatures can be determined by conventional methods, such as Differential Scanning Colorimetry (DSC).

Useful polyesterionomers have an inherent viscosity of about 0.01 to about 0.65, preferably about 0.16 to about 0.31. Polyesterionomers having inherent viscosities in the preferred range are compatible with the preferred charge control agents, optionally used in the liquid electrographic developers of the present invention. Inherent viscosities of the polymers were measured in a 1:1 by weight solution of phenol:chlorobenzene at 25° C. at a concentration of 0.25 grams per 100 ml of solution using a GCA/Precision Scientific Viscometer.

$G^1$ and $G^2$ components of Formula I polyesterionomers may be derived from diols or their derivatives, including aliphatic, alicyclic, and aromatic diols. Useful diols include alkylene glycols, and monocyclic and polycyclic diols.

Typical monocyclic diols include 1,4-cyclohexanediol; 1,4-cyclohexanedimethanol; 1,4-cyclohexanediethanol; 1,4-bis(2-hydroxyethoxy)cyclohexane; 1,4-benzenedimethanol; 1,4-benzenediethanol and the like.

Typical polyalicyclic diols from which $G^2$ may be derived include norbornylene glycol, decahydro-2,6-naphthalenedimethanol.

Typical alkylene glycols from which $G^1$ and $G^2$ may be derived include ethylene glycol, diethylene glycol, triethylene glycol, 1,2-propanediol, 1,3-propanediol, 1,4-butanediol, 2,3-butanediol, 1,5-pentanediol, 1,6-hexanediol, 1,7-heptanediol, 1,8-octanediol, 1,9-nonanediol, 1,10-decanediol, 1,12-dodecanediol, neopentyl glycol, 2,2,4-trimethyl-1,16-hexanediol and 4-oxa-2,6-heptanediol.

Diols used to prepare the representative polyesterionomers of following Table I include:

| | |
|---|---|
| 1,4-Bis(2-hydroxyethoxy)cyclohexane | (CHE) |
| 1,4-Cyclohexanedimethanol | (CH) |
| 2,2-Dimethyl-1,3-dihydroxypropane | (NPG) |
| Ethyleneglycol | ($C_2$) |
| 1,3-Propanediol | ($C_3$) |
| 1,4-Butanediol | ($C_4$) |
| 1,5-Pentanediol | ($C_5$) |
| 1,1-Hexanediol | ($C_6$) |

R and Ar components of Formula I polyesterionomers may be derived from any of a variety of aliphatic, alicyclic, and aromatic dicarboxylic acids or their derivatives, such as esters, and anhydrides, and acid halides. Such acids include succinic acid, sebacic acid, 2-methyladipic acid, diglycolic acid, thiodiglycolic acid, fumaric acid, cyclohexane-1,3-dicarboxylic acid, cyclohexane-1,4-dicarboxylic acid, cyclopentane-1,3-dicarboxylic acid, 2,5-norbornanedicarboxylic acid, phthalic acid, isophthalic acid, terephthalic acid, t-butylisophthalic acid, 2,6-naphthalenedicarboxylic acid, 1,4-naphthalenedicarboxylic acid, 1,5-naphthalenedicarboxylic acid, 1,7-naphthalenedicarboxylic acid, 4,4'-diphenic acid, 4,4'-sulfonyldibenzoic acid, 4,4'-oxydibenzoic acid, binaphthyldicarboxylic acid, and 9,10-triptycenedicarboxylic acid.

Dicarboxylic materials from which R and Ar were derived in making the representative compounds of Table I, include:

| | |
|---|---|
| Diethyl succinate | (S) |
| Esters of phthalic (P), terephthalic (T), isophthalic (I), hydrophthalic (HP) and hydroterephthalic acids (HT) and dimethyl terephthalate | |
| Dimethyl adipate | (DMP) |
| Dimethyl-2,6-naphthalene dicarboxylate | (NP) |
| Dimethylester of 1,1,3-trimethyl-3-phenylindan -5,4'-dicarboxylic acid | (PIDA) |
| Dibutyl 4,4'-sulfonyldibenzoate | (PS) |
| p-Phenylenebis(ethyl acrylate) | (DEBA) |
| p-Phenylenebis(ethyl propionate) | (HDEBA) |
| Dimethyl cyclohexane 1,4-dicarboxylate | (1,4CH) |
| Dimethylcyclohexane-1,2-dicarboxylate | (1,2CH) |
| 4-Methyl-4-cyclohexene-1,2-dicarboxylic acid | (M) |

Useful dicarboxylic acids which may be employed as precursors for Component A of Formula I are dicarboxylic acids containing a disulfonamido group. Such acids typically have the structure of Formula II:

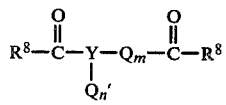

wherein
$R^8$ can be, for instance, an hydroxyl group where the material is a free acid, an oxy atom linkage where the compound is an acid anhydride, a halogen atom where the compounds is in the form of an acid halide or an alkoxy group where the compounds is in the form of an ester;

m and n are integers whose sum equals 1;

Q is defined by the structure of Formula III:

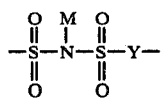

Q' is defined by the structure of Formula IV:

Y is an aromatic group, such as an arylene group (e.g., phenylene, naphthylene,);

Y' is an alkyl or aromatic group, such as an aryl, alkaryl or aralkyl group, in which each of the alkyl moieties includes from 1 through 12 carbon atoms and, preferably, from 1 through 6 carbon atoms; and M is a hydrogen or a monovalent cation such as an alkali metal or ammonium cation.

A listing of representative compounds according to Formula II for use i forming A of Formula I is: 3,3'-[(sodio-imino)disulfonyl]dibenzoic acid; 3,3'-[(potassiumimino)disulfonyl]dibenzoic acid; 3,3'-[(lithium-imino) disulfonyl]-dibenzoic acid; 4,4'-[(lithium-imino)-disulfonyl]dibenzoic acid; 4,4'-[(sodio-imino)disulfonyl]dibenzoic acid; 4,4'-[(potassium-imino)disulfonyl]dibenzoic acid; 3,4'-[(lithium-imino)disulfonyl]-dibenzoic acid; 3,4'-[(sodioimino)disulfonyl]dibenzoic acid; 5-[4-chloronaphth-1-ylsulfonyl-(sodio-imino)-sulfonyl]isophthalic acid; 4,4'-[(potassium-imino)-disulfonyl]dinaphthoic acid; 5-[p-tolylsulfonyl-(potassiumimino)-sulfonyl]isophthalic acid; 4-[p-tolyl-sulfonyl-(sodio-imino)-sulfonyl]-1,5-naphthalenedicarboxylic acid; 5-[n-hexylsulfonyl-(lithium imino)sulfonyl]-isophthalic acid; 2-[phenylsulfonyl-(potassium-imino)sulfonyl]-isophthalic acid; 2-[phenylsulfonyl-(potassium-imino)-sulfonyl]-terephthalic acid and functional derivatives thereof. These and other dicarboxylic acids useful in forming repeating units A of the crystalline polymeric polyesters used in this invention are disclosed in Caldwell and Jones U.S. Pat. No. 3,546,180, issued Dec. 8, 1970, the disclosure of which is here incorporated by reference.

Dicarboxylic materials used to form the representative polyesterionomers of Table I include:

| | |
|---|---|
| Dimethyl-3,3'[Bis(Imino)disulfonyl]dibenzoate Sodium Salt | (BSP) |
| Dimethyl 5-sodiosulfoisophthalate | (SIP) |
| Dimethyl 5-(4-sodiosulfphenoxy)isophthalate | (PP) |
| Dimethyl 4,4'[Bis(Imino)disulfonyl]dibenzoate Sodium Salt | (DSP) |
| Dimethyl 5-(N-Potassio-para-toluenesulfonamido sulfonyl)isophthalate | (TSP) |

A series of polyesterionomers were prepared and evaluated for potential use in an electrophotographic, liquid toner formulation. Representative polymers are presented in Table I. The ionomeric components of these polymers are represented by the symbols presented earlier herein.

In general, the polymers were prepared employing the usual two-stage polyesterification technique. Initially, the reactants were weighed into a 100 ml, round-bottomed polymerization flask. The flask was flushed with a slow stream of nitrogen for 30 minutes before it was immersed into a 235° C. salt bath. While still under a nitrogen atmosphere, the reactants were allowed to come to a clear melt before adding two drops of the catalyst, tetraisopropylorthotitanate. After the first stage of the polymerization was completed, the reaction was placed under a 0.2 mm atmosphere with constant stirring controlled by a Cole-Parmer Constant Speed and Torque Control Unit. The second stage of the polyesterification is completed when the desired degree of inherent viscosity has been attained.

TABLE I

| Polymer No. | $G^2$ (100−w) | $G^1$ (w) | R (x) | Ar (y) | A (z) | Tg |
|---|---|---|---|---|---|---|
| 1 | $C_2$ (70) | CH | NP (75) | (DEBA) (20) | BSP (5) | 107 |
| 2 | $C_2$ (70) | " | PIDA (75) | " | " | 140 |
| 3 | $C_2$ (70) | " | T (75) | " | " | 85 |
| 4 | $C_2$ (50) | NPG (50) | PIDA (75) | " | " | 128 |
| 5 | $C_2$ (70) | CH (30) | T (75) | " | SIP (5) | 89 |
| 6 | $C_2$ (50) | NPG (50) | PIDA (65) | " | BSP (15) | 132 |
| 7 | | CHE (100) | " | " | " | 66 |
| 8 | | " | PIDA (75) | " | BSP (5) | 80 |
| 9 | | NPG (50) | " | S (20) | " | 68 |
| 10 | $C_2$ (70) | CH (30) | " | " | " | — |
| 11 | $C_2$ (50) | NPG (50) | T (75) | DEBA (20) | " | 87 |
| 12 | | CHE (100) | PIDA (65) | DEBA (25) | BSP (10) | 83 |
| 13 | " | NPG (50) | PIDA (75) | DEBA (20) | PP | 125 |
| 14 | " | " | " | " | TSP (5) | 110 |
| 15 | " | CHE (100) | NP (75) | " | BSP (5) | 59 |
| 16 | " | NPG (50) | PIDA (75) | DEBA (22.5) | TSP (2.5) | 124 |
| 17 | " | CHE (100) | " | DEBA (20) | TSP (5) | 82 |
| 18 | " | CHE (100) | " | DEBA (20) | PP (5) | 80 |
| 19 | " | NPG (50) | " | HDEBA (20) | TSP (5) | 97 |
| 20 | " | " | " | DMP (20) | " | 118 |
| 21 | | $C_4$ (100) | " | HDEBA (20) | " | 80 |
| 22 | | $C_5$ (100) | " | " | " | 72 |
| 23 | | $C_6$ (100) | " | " | " | 49 |
| 24 | | $C_3$ (100) | " | " | " | 82 |
| 25 | " | NPG (50) | PS (75) | " | " | 87 |
| 26 | $C_4$ (50) | " | PIDA (75) | " | " | 82 |
| 27 | $C_2$ (50) | " | PIDA (65) | HDEBA (30) | " | 80 |
| 28 | " | " | PIDA (70) | HDEBA (25) | " | 87 |
| 29 | $C_3$ (50) | " | PIDA (75) | HDEBA (20) | " | 92 |
| 30 | $C_2$ (50) | " | " | HDEBA (20) | PP (5) | 105 |
| 31 | " | " | " | HDEBA (20) | SIP (5) | 99 |

TABLE I-continued

| Polymer No. | G² (100−w) | G¹ (w) | R (x) | Ar (y) | A (z) | Tg |
|---|---|---|---|---|---|---|
| 32 | " | " | " | HDEBA (20) | BSP (5) | 103 |
| 33 | " | " | " | 1,4CH (20) | TSP (5) | 122 |
| 34 | | NPG (100) | 1,4CH (50) | T (45) | SIP (5) | |
| 35 | | " | 1,4CH (60) | T (35) | " | |
| 36 | | " | 1,4CH (81) | T (15) | SIP (4) | |
| 37 | | " | 1,4CH (50) | T (45) | TSP (5) | |
| 38 | | " | 1,4CH (59) | T (45) | HSIP (6) | |
| 39 | | " | P (60) | 1,2CH (35) | SIP (5) | |
| 40 | | " | m (50) | 1,2CH (45) | " | |
| 41 | | " | 1,4CH (50) | " | TSP | |
| 42 | | " | 1,4CH (71) | T (25) | SIP (4) | |
| 43 | | " | 1,4CH (62) | T (35) | TSP (3) | |
| 44 | | " | 1,4CH (35) | T (60) | SIP (5) | |
| 45 | | " | 1,4CH (45) | I (50) | " | |
| 46 | | " | 1,4CH (55) | T (40) | " | |
| 47 | | " | 1,4CH (45) | dibromophenylene (45) | SIP (10) | |
| 48 | | NPG (100) | T (45) | methyl phenylene (50) | TSP (5) | |
| 49 | | " | 1,4CH (50) | nitro phenylene (45) | SIP (5) | |
| 50 | | " | I (50) | tetrahydronapthalene (45) | " | |
| 51 | | " | " | octahydronapthalene (45) | " | |
| 52 | | " | P | 1,2CH | " | |
| 53 | | " | T (45) | M (50) | TSP (5) | |

The liquid electrographic developers of the present invention, typically comprise a dispersion of the polyesterionomers in a suitable carrier liquid.

Such developers may be prepared by, for an example, the methods disclosed in U.S. Pat. No. 3,788,995 granted Jan. 29, 1974 to Stahly et al or U.S. Pat. No. 4,052,325 granted to Santilli on Oct. 4, 1977. The procedure disclosed in Stahly et al is especially useful for those polyesterionomers which are soluble in Solvesso 100. Solvesso 100 is an alkylated aromatic having a major aromatic component and a boiling range of from 150°–185° C. sold by Humble Oil & Refining Co. The procedure disclosed in Santilli is especially useful for those polyesterionomers which are insoluble in Solvesso 100.

If the binder is insoluble in Solvesso 100, the colorant and charge control agent if desired, and binder in a 1:1:1 ratio are ballmilled in a chlorinated solvent for one day. This concentrate is then precipitated into Isopar G ® by stirring. The binder and colorant particles are precipitated while the charge control agent stays in solution. The particles are collected by filtration or centrifugation, depending on particle size. The particle cake is dried and then redispersed in Isopar ®. The charge control agent, if desired is added to this dispersion, which is milled for one week, and the developer concentrate is formed.

If the binder polymer is soluble in Solvesso 100, the colorant and charge control agent can be milled in Solvesso 100 for one to two weeks. A solution of binder in Solvesso 100 are added to the above solution of colorant and charge control agent. After mixing, the solution is precipitated into Isopar G ® and binder-pigment particles are formed. Solvesso 100 is compatible with the toner formulation; thus there is no need to remove it. This developer concentrate can be parpared quickly and easily, even in large-scale situations.

A working strength liquid developer is typically prepared from the above concentrates by mixing an amount of concentrate together with an amount of suitable liquid carrier vehicle to provide a developer containing the desired amount of toner particles dispersed in the liquid carrier vehicle.

In general, useful working strength developers of the present invention contain from about 0.005 to about 5% by weight of the polyesterionomer binder. These developers contain from about 99.995 to about 90% by weight of liquid carrier vehicle. Best results are generally obtained wherein the toner particles (which contain both polyesterionomer and colorant) are present in the range of from about 0.01 to about 10% by weight and the liquid carrier is present in the range of from about 99.99 to about 90% by weight of the resultant developer composition.

Suitable liquid carrier vehicles useful in the developer compositions of the present invention may be selected from a variety of liquid materials. These materials should be electrically insulating and have a fairly low dielectric constant. The carrier vehicle should be physically inert with respect to the polyesterionomer of the present invention. The term "physically inert" means that the polyesterionomer toner particles contained in the liquid developers of the invention are not swellable, softenable or solubilized by the liquid carrier.

Useful carrier liquids have a dielectric constant of less than about 3, and a volume resistivity greater than about $10^{10}$ ohm/cm. Suitable carrier liquids include halogenated hydrocarbon solvents, for example, fluorinated lower alkanes, such as trichloromonofluoromethane, trichlorotrifluoroethane, etc., having a boiling range typically from about 2° to about 55° C. Other hydrocarbon solvents are useful, such as isoparaffinic hydrocarbons having a boiling range of from about 145° to about 185° C., such as Isopar G (a trademark of the Exxon Corporation) or cyclohydrocarbons, such as cyclohexane. Additional carrier liquids which may be useful in certain situations include polysiloxanes, odorless mineral spirits, octane and the like.

Although it is possible to use the liquid developers of the present invention without further addenda such as charge control agents or colorants, it is often desirable to incorporate such addenda in the developer.

If a colorless image is desired, it is unnecessary to add any colorant. For example, the developer may be used to form a colorless hydrophobic image in a lithographic printing process. In such case, the resultant developer composition consists essentially of the liquid carrier vehicle and the polyesterionomer toner particles of the present invention.

When visible images are desirable colorants are used in the liquid developers of the present invention. Useful results may be obtained from virtually any of a wide variety of known dyes or pigment materials. Particularly good results are obtained by using various kinds of carbon black pigments.

A representative list of colorants may be found, for example, in *Research Disclosure*, Volume No. 109, May, 1973, in an article entitled "Electrophotographic Elements, Materials and Processes".

Optionally, the developers of the present invention may include various change control agents to enhance a uniform charge polarity on the developer toner particles.

Various charge control agents have been described heretofore in the liquid developer art. Hence, an extensive discussion of such agents is deemed unnecessary. Examples of such charge control agents may be found in U.S. Pat. No. 3,788,995, issued Jan. 29, 1974, which describes various polymeric charge control agents, such as terpolymers, for example, a styrene-lauryl methacrylate-sulfoethyl methacrylate terpolymer. These polymeric charge control agents are typically substantially soluble in the liquid carrier vehicle or at least readily dispersible therein so that there is no problem of these materials settling out of the developer.

Various non-polymeric charge control agents may also be employed such as, for example, the various metal salts described, for example, in Beyer, U.S. Pat. No. 3,417,019, issued Dec. 17, 1968. Other charge control agents known in the liquid developer art may also be employed.

A partial listing of preferred representative polymeric charge control agents for use in the present invention includes poly(vinyltoluene-co-lauryl methacrylate-co-lithium methacrylate-co-methacrylic acid), poly(styrene-co-lauryl methacrylate-co-lithium sulfoethyl methacrylate), poly(vinyltoluene-co-lauryl methacrylate-co-lithium methacrylate), poly(styrene-co-lauryl methacrylate-co-lithium methacrylate), poly(t-butylstyrene-co-lauryl methacrylate-co-lithium methacrylate), or poly(t-butylstyrene-co-lithium methacrylate).

The amount of charge control agent used will vary depending upon the particular charge control agent and its compatibility with a particular toner particle and liquid carrier vehicle. It is usually desirable to employ an amount of charge control agent within the range of from about 0.1 to about 2.0 weight percent based on the total weight of a working strength liquid developer composition. The charge control agent, may be added in the liquid developer during the preparation of a so-called developer concentrate, or the charge control agent is added in the final working strength developer simply by dissolving or dispersing the charge control agent in the liquid carrier vehicle at the time the developer concentrate is combined with the liquid carrier vehicle to form a working strength developer.

EXAMPLES

Liquid electrographic developers containing Isopar G ®, carbon pigment, a charge control agent and one of the polyesterionomers of Table I were prepared according to one of the above described procedures. The carbon pigment, charge control agent and the selected polyesterionomer were ball milled in 1:1:1 weight ratio in a chlorinated solvent. The charge control agent was either poly(vinyltoluene-co-lauryl methacrylate-co-lithium methacrylate-co-methacrylic acid) 56/40/3.6/0.4 weight percent, poly[vinyltoluene-co-lauryl methacrylate-co-$\beta$-(methacryloyloxy)ethyltrimethylammonium p-toluenesulfonate] 64/34/2 weight percent, or poly(t-butylstyrene-co-lauryl methacrylate-co-lithium methacrylate). The prepared developers contained about 0.035 weight percent of polyesterionomer.

EXAMPLES 1–34

Thirty-four different liquid electrographic developers were prepared. Each contained a different polyesterionomer binder selected from polymers 1–34 of Table I. Electrographic images were prepared with each developer according to conventional techniques on an aggregate photoconductive film of the type described in U.S. Pat. No. 3,873,311. The images were tested, qualitatively, for abrasion or rub resistance by rubbing the images with an index finger containing a normal amount of body oil. The rub resistance was rated according to how long it took to smudge or abrase the toner images as follows 0—No image abrasion after 10 cycles; excellent rub resistance.

1—Slight image abrasion after 5 cycles; very good rub resistance.

2—Severe image abrasion after 1 cycle; fair rub resistance.

One cycle is equivalent to rubbing the image with a finger one time.

Polyesterionomers 1–34 were found to have improved rub resistance compared to the developers disclosed in the aforementioned Stahly et al and Santilli patents. Polyesterionomers provided images having very good to excellent rub resistance.

EXAMPLES 35–53

A device was assembled to provide objective measurements of the wearing properties of fused liquid developed images on an aggregate photoconductive film of the type described in U.S. Patent 3,873,311 to Contois et al. It consisted of a stainless steel cylinder weighing about 700 g and a movable 4×6" steel pad. On one end of the cylinder, a conical cork was glued. The cork tip measured 9 mm in diameter. The film carrying fused, solid area liquid developer densities varying from 0.5 to 2.0 was taped over the pad which could be moved back and forth under the weight of the cylinder cork tip. A facial tissue, wrapped over the tip, could easily be removed after each test. The results are reported by the number of cycles it took to remove the toned image from the film. The tissue could also be wetted with oleic acid to provide an indication of toner resistance to oil smudging.

Nineteen different images were formed with 19 different developer compositions as in Examples 1–34. Each developer contained a different polyesterionomer selected from polymers 35–53 of Table I. Each image was tested with the above described device. Polyesterionomers 35-53 provided images which possessed greater rub resistance than the developers of Stahly et al and Santilli. Typical results for those polyesterionomers providing very good to excellent abrasion or rub resistance are as follows.

TABLE II

| Polyesterionomer No. | Image Density | Oleic* | Dry* |
|---|---|---|---|
| 35 | 2.07 | 13-40 | 60-100 |
| 36 | 1.61 | 36-100 | >100 |
| 42 | 1.60 | 18-60 | >100 |
| 44 | 1.80 | 6-23 | 40-90 |
| 46 | 1.45 | 30-80 | >100 |
| 47 | 1.81 | 30-60 | >100 |
| 49 | 1.45 | 30-90 | >100 |
| 52 | 1.40 | 18-50 | 50-100 |
| 51 | 1.40 | 50-100 | >100 |

*The first number is the cycle when the image began smudging and the last number is the cycle when all of the image has been removed. The symbol > indicates that image smudging had not begun after 100 cycles.

This invention has been described in detail with particular reference to preferred embodiments thereof, but it will be understood that variations and modifications can be effected within the spirit and scope of the invention.

We claim:

1. A liquid electrographic developer composition comprising
   (a) an electrically insulating liquid; and
   (b) a polymeric binder having the following structure

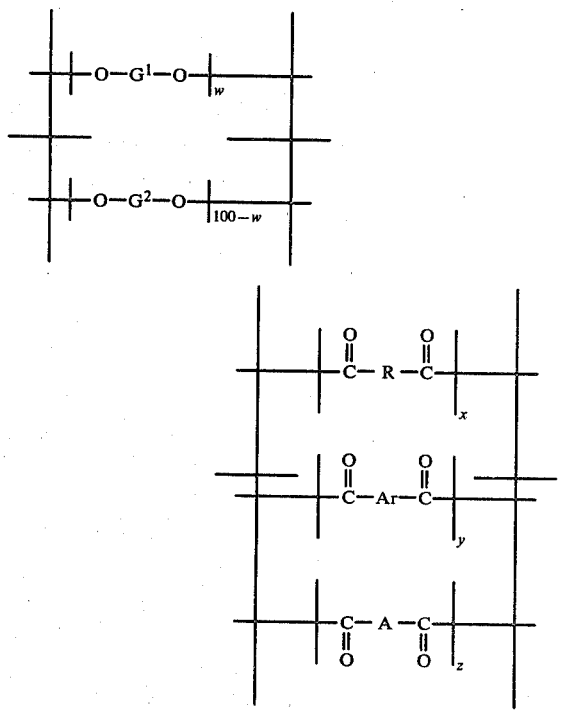

wherein $G^1$ represents a straight or branched chain alkylene having about 2 to 12 carbon atoms, or, substituted or unsubstituted, cycloalkylene, cycloalkylenebis(oxyalkylene) or cycloalkylenedialkylene;

$G^2$ represents, substituted and unsubstituted, arylene, cycloalkylene or a straight or branched chain oxygen free alkylene having about 2 to 12 carbon atoms;

R and Ar, which are always different, represent 1,1,3-trimethyl-3-phenylindan-5, 4'-diyl, or an unsaturated, substituted or unsubstituted alicyclic group having 7-10 carbon atoms or a substituted or unsubstituted moiety selected from the group consisting of alkylene, cycloalkylene, sulfonyldiarylene, arylene, arylenevinylene, arylenealkylene, arylenebisvinylene or arylenebisalkylene;

A represents a sulfoarylene, sulfoaryloxyarylene, sulfocycloalkylene, iminodisulfonylarylene, iminobis(sulfonylarylene), sulfoaryloxysulfonylarylene and sulfoaralkylarylene or the alkali metal or ammonium salt thereof;

said $G^1$, $G^2$, R and Ar substituents are selected from the group consisting of alkyl, alkoxy, nitro, carboxyl, halo and cyano;

w is about 50 to about 100 mole percent of the total diol component; and of the total acid component;

x is about 25 to about 95 mole percent;

y is about 1 to about 74 mole percent; and z is about 4 to about 15 mole percent.

2. A liquid electrographic developer composition as in claim 10, wherein the mole percents in said polymeric binder are as follows w is about 65 to 100 mole percent;

x is about 50 to 80 mole percent;

y is about 15 to 50 mole percent; and z is about 5 to 15 mole percent.

3. A liquid electrographic developer composition comprising
   (a) an electrically insulating carrier liquid; and
   (b) a polymeric binder having the following structure

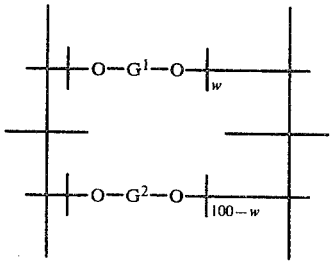

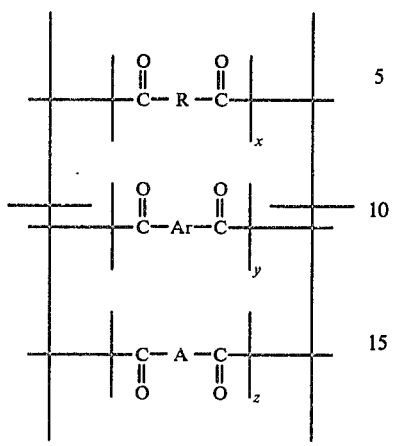

wherein

G¹ represents straight or branched chain oxygen free alkylene having 2 to 12 carbon atoms, or, substituted or unsubstituted, cyclohexylene, cyclohexylenebis(oxyethylene), 1,3-cyclobutylenedimethylene;

G² represents, substituted or unsubstituted, phenylene, cyclohexylene or a straight or branched chain oxygen free alkylene group having about 2 to 12 carbon atoms;

R and Ar, which are always different, represent 1,1,3-trimethyl-3-phenylindan-5,4'-diyl, or a substituted or unsubstituted cyclic moiety selected from the group consisting of ortho- or meta-cyclohexylene, cyclopentylene, 2-norbornen-5,6-ylene, 2,6-octahydronaphthalene, 1,2,3,4-tetrahydro-2,6-naphthylene, naphthylene, phenylene, phenylenevinylene, phenyleneethylene, phenylenebisvinylene and phenylenebisethylene;

A represents a sulfophenylene, sulfophenoxyphenylene, sulfocyclohexylene, 5-[N-(4-tolylsulfonyl)iminosulfonyl]-1,3-phenylene or iminobis(-sulfonyl-1,3-phenylene), or alkali metal or ammonium salts thereof;

said G¹, G², R and AR substituents are selected from the group consisting of alkyl, alkoxy, nitro, carboxyl, halo and cyano;

w is about 50 to about 100 mole percent;
x is about 25 to about 95 mole percent;
y is about 1 to about 74 mole percent; and
z is about 4 to about 15 mole percent.

4. A composition as in claim 12, wherein the mole percent of the monomeric components in said polymeric binder are as follows w is about 65 to about 100 mole percent;
x is about 50 to about 80 mole percent;
y is about 15 to about 50 mole percent; and
z is about 5 to about 15 mole percent.

5. A liquid electrographic developer composition comprising (a) an electrically insulating liquid, and
(b) a polymeric binder having the following structure

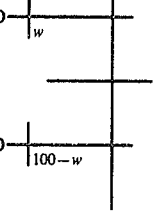
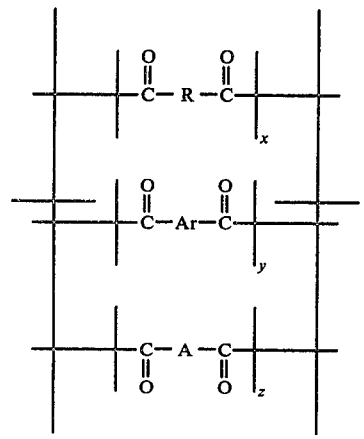

wherein

G¹ represents alkylene, cyclohexylenebis(oxyethylene) or a cyclohexylenedimethylene;

G² represents a straight or branched chain alkylene having 2 to 12 carbon atoms;

R and Ar, which are always different, represent 1,1,3-trimethyl-3-phenylindan-5,4'-diyl or a substituted or unsubstituted, phenylenevinylene, phenyleneethylene, phenylenebisvinylene or phenylenebisethylene and said substituents are selected from the group consisting of alkyl, alkoxy, nitro, halo, carboxyl and cyano;

A represents sodium sulfophenylene, sodium sulfophenoxyphenylene, sodium sulfocyclohexylene, 5-[N-(4-tolylsulfonyl)potassioiminosulfonyl]-1,3-phenylene or sodioiminobis(sulfonyl-1,3-phenylene);

w is about 50 to about 100;
x is about 50 to about 95 mole percent;
y is about 5 to about 50 mole percent; and
z is about 4 to about 15 mole percent.

6. A composition according to claim 5, wherein the mole percent of the monomer components of said polymeric binder are as follows w is about 65 to about 100 mole percent;
x is about 60 to about 80 mole percent;
y is about 45 to about 50 mole percent; and
z is about 5 to about 15 mole percent.

7. A liquid electrographic developer composition comprising (a) an electrically insulating liquid; and
(b) a polymeric binder selected from the group consisting of
Poly[ethylene-co-2,2-dimethyl-1,3-propylene (50:50) 1,1,3-trimethyl-3-phenyl-5,4'-indandicarboxylate-co-3,3'-(p-phenylene)diacrylate-co-5-(N-potassio-p-toluenesulfonamidosulfonyl)isophthalate (75/20/5)]

Poly[ethylene-co-2,2-dimethyl-1,3-propylene (50:50) 1,1,3-trimethyl-3-phenyl-5,4'-indandicarboxylate-co-3,3'-(p-phenylene)bispropionate-co-5-(N-potassio-p-toluenesulfonamidosulfonyl)isophthalate (75/20/5)]

Poly[1,4-cyclohexylenebis(oxyethylene) 1,1,3-trimethyl-3-phenyl-5,4'-indandicarboxylate-co-3,3'-(p-phenylene)diacrylate-co-3,3'-(sodioiminodisulfonyl) dibenzoate (75/20/5)]

Poly[1,4-cyclohexylene-bis(oxyethylene) 1,1,3-trimethyl-3-phenyl-5,4'-indandicarboxylate-co-3,3'-(p-phenylene)diacrylate-co-5-(4-sodiosulfophenxoy) isophthalate (75/20/5)]

Poly[1,4-cyclohexylene-bis(oxyethylene) 1,1,3-trimethyl-3-phenyl-5,4'-indandicarboxylate-co-3,3'-(p-phenylene)diacrylate-co-5-(N-potassio-p-toluenesulfonamidosulfonyl)isophthalate (75/20/5)]

Poly[1,4-cyclohexylene-bis(oxyethylene) 1,1,3-trimethyl-3-phenyl-5,4'-indandicarboxylate-co-3,3'-(p-phenylene)diacrylate-co-5-sodiosulfoisophthalate (75/20/5)]

Poly[2,2-dimethyl-1,3-propylene terephthalate-co-hexahydroterephthalate-co-5-sodiosulfoisophthalate (45/50/5)]

Poly[2,2-dimethyl-1,3-propylene isophthalate-co-1,2-cyclohexanedicarboxylate-co-5-sodiosulfoisophthalate (50/45/5)]

Poly[2,2-dimethyl-1,3-propylene 4-methyl-4-cyclohexene-1,2-dicarboxylate-co-terephthalate-co-5-(N-potassio-p-toluenesulfonamidosulfonyl)isophthalate (50/45/5)]

Poly[2,2-dimethyl-1,3-propylene 1,4-cyclohexanedicarboxylate-co-isophthalate-co-5-(N-potassio-p-toluenesulfonamidosulfonyl)isophthalate (55/40/5)]

Poly[2,2-dimethyl-1,3-propylene 3-nitrophthalate-co-1,2-cyclohexane-dicarboxylate-co-5-sodiosulfoisophthalate (45/50/5)]

Poly[2,2-dimethyl-1,3-propylene 5-nitroisophthalate-co-1,2-cyclohexanedicarboxylate-co-5-sodiosulfoisophthalate (40/55/5)]

Poly[2,2-dimethyl-1,3-propylene 5-nitroterephthalate-co-1,2-cyclohexanedicarboxylate-co-5-sodiosulfoisophthalate (40/55/5)]

8. A composition according to claims 1, 2, 3, 4, 5, 6, or 7, which includes a colorant.

9. A polymeric composition according to claims 1, 2, 3, 4, 5, 6, or 7, which also includes a charge control agent.

10. A composition according to claims 1, 2, 3, 4, 5, 6 or 7, wherein said polymeric binder has a Tg less than about 100° C.

11. In an electrographic development process wherein a latent electrostatic image carried on an electrographic insulating element is developed by applying a liquid electrographic developer composition to said latent image, the improvement which comprises applying, as said liquid developer composition to said latent image, a composition comprising
(a) an electrically insulating liquid; and
(b) a polymeric binder having the following structure

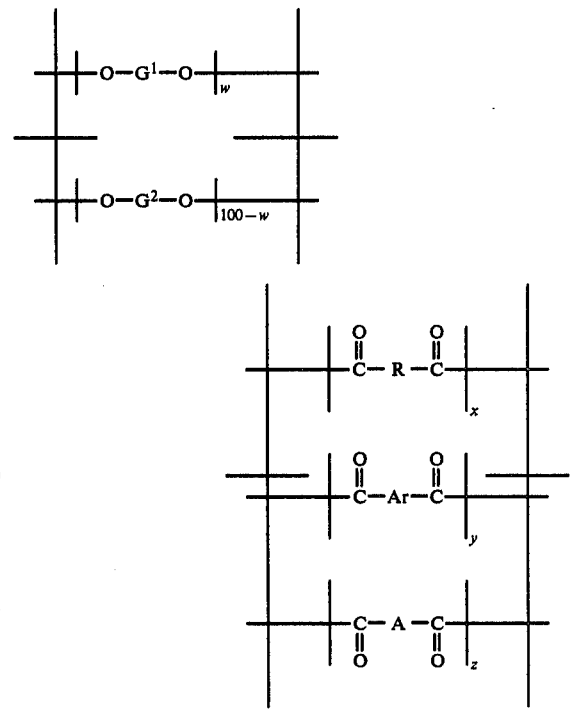

wherein
$G^1$ represents a straight or branched chain alkylene having about 2 to 12 carbon atoms, or, substituted or unsubstituted cycloalkylene, cycloalkylenebis(oxyalkylene) or cycloalkylenedialkylene;

$G^2$ represents, substituted and unsubstituted, arylene, cycloalkylene or a straight or branched chain oxygen free alkylene having about 2 to 12 carbon atoms;

R and Ar, which are always different, represent 1,1,3-trimethyl-3-phenylindan-5, 4'-diyl, or an unsaturated, substituted or unsubstituted alicyclic group having 7–10 carbon atoms or a substituted or unsubstituted moiety selected from the group consisting of alkylene, cycloalkylene, sulfonyldiarylene, arylene, arylenevinylene, arylenealkylene, arylenebisvinylene or arylenebisalkylene;

A represents a sulfoarylene, sulfoaryloxyarylene, sulfocycloalkylene, iminodisulfonylarylene, iminobis(sulfonylarylene), sulfoaryloxysulfonylarylene and sulfoaralkylarylene or the alkali metal or ammonium salt thereof;

said $G^1$, $G^2$, R and Ar substituents are selected from the group consisting of alkyl, alkoxy, nitro, carboxyl, halo and cyano;

w is about 50 to about 100 mole percent of the total diol component; and of the total acid component;

x is about 25 to about 95 mole percent;

y is about 1 to about 74 mole percent; and z is about 4 to about 15 mole percent.

* * * * *

UNITED STATES PATENT AND TRADEMARK OFFICE
CERTIFICATE OF CORRECTION

PATENT NO. : 4,202,785
DATED : May 13, 1980
INVENTOR(S) : Merrill et al

It is certified that error appears in the above-identified patent and that said Letters Patent are hereby corrected as shown below:

Column 15, line 48, "AR" should read --Ar---; line 56, "12" should read --3--. Column 17, lines 31-32, that part of the formula reading "toluenesulfonamidosulfonyl-)isophthalate" should read --toluenesulfonamidosulfonyl)-isophthalate--.

Signed and Sealed this

Thirty-first Day of March 1981

[SEAL]

Attest:

RENE D. TEGTMEYER

Attesting Officer   Acting Commissioner of Patents and Trademarks